Jan. 25, 1966 H. E. KALLMANN 3,230,766
ULTRASONIC FLOWMETER
Filed Nov. 1, 1962 2 Sheets-Sheet 1
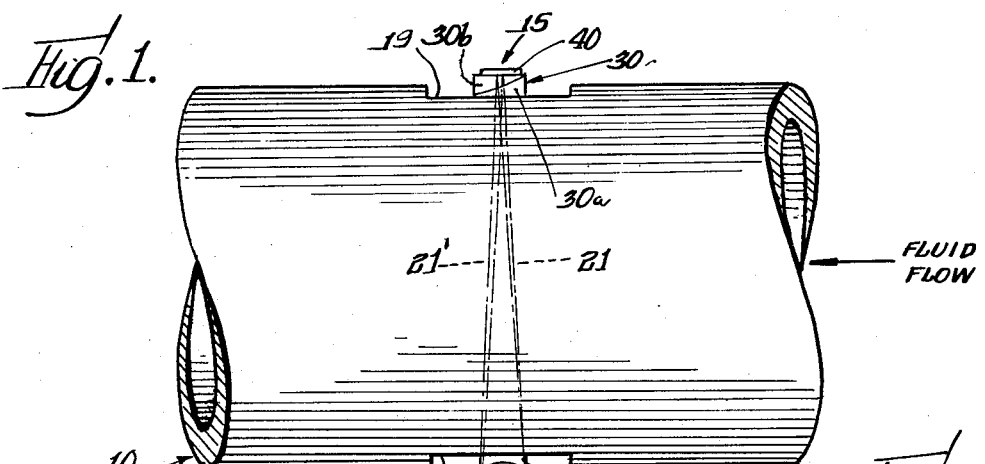
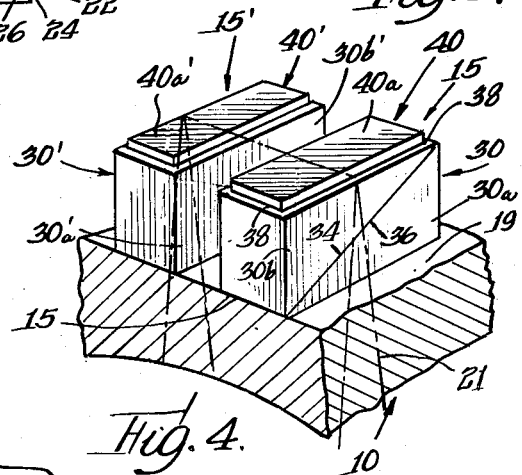
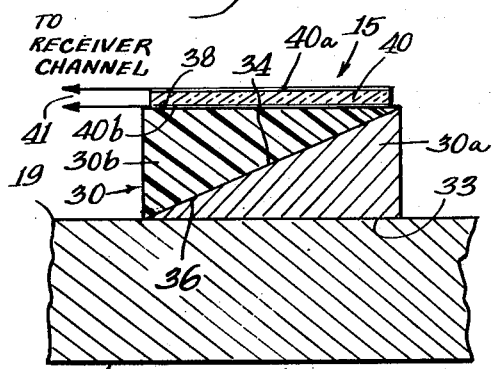
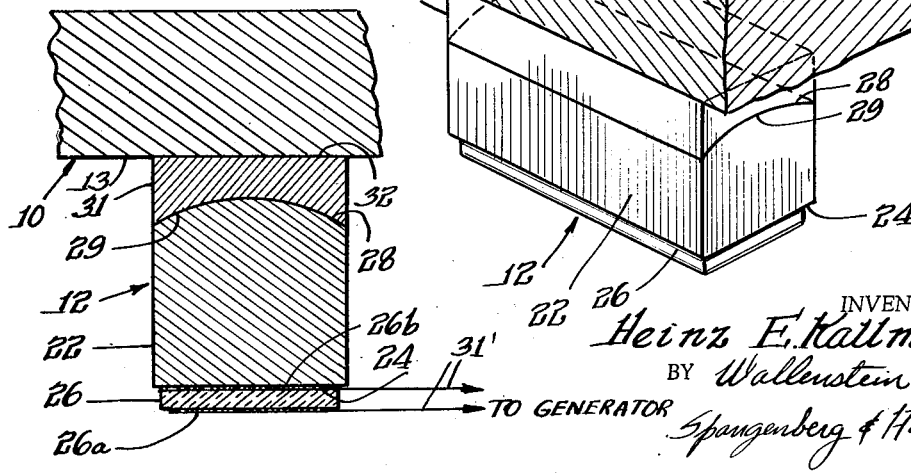
INVENTOR.
Heinz E. Kallmann
BY Wallenstein,
Spangenberg & Hattis
Attys.

Jan. 25, 1966   H. E. KALLMANN   3,230,766
ULTRASONIC FLOWMETER
Filed Nov. 1, 1962   2 Sheets-Sheet 2
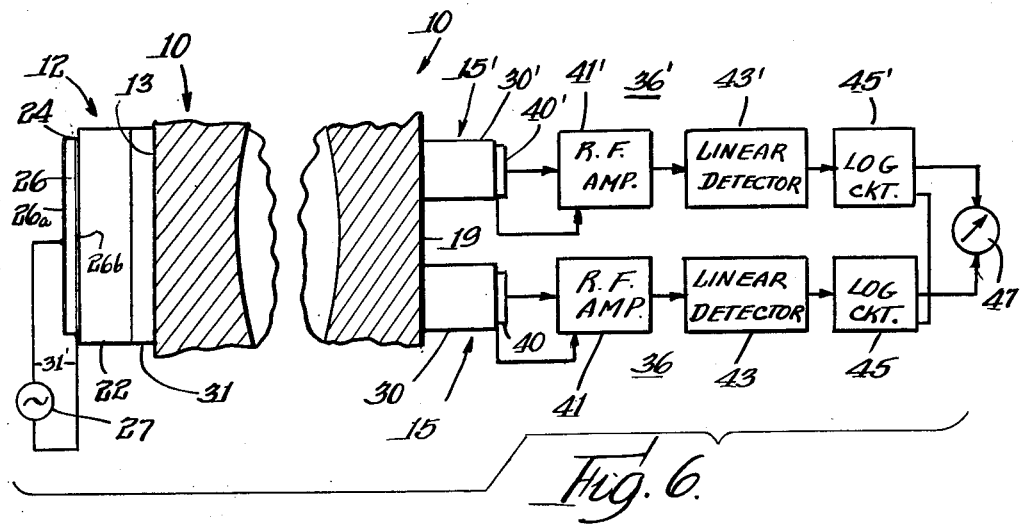
Fig. 6.
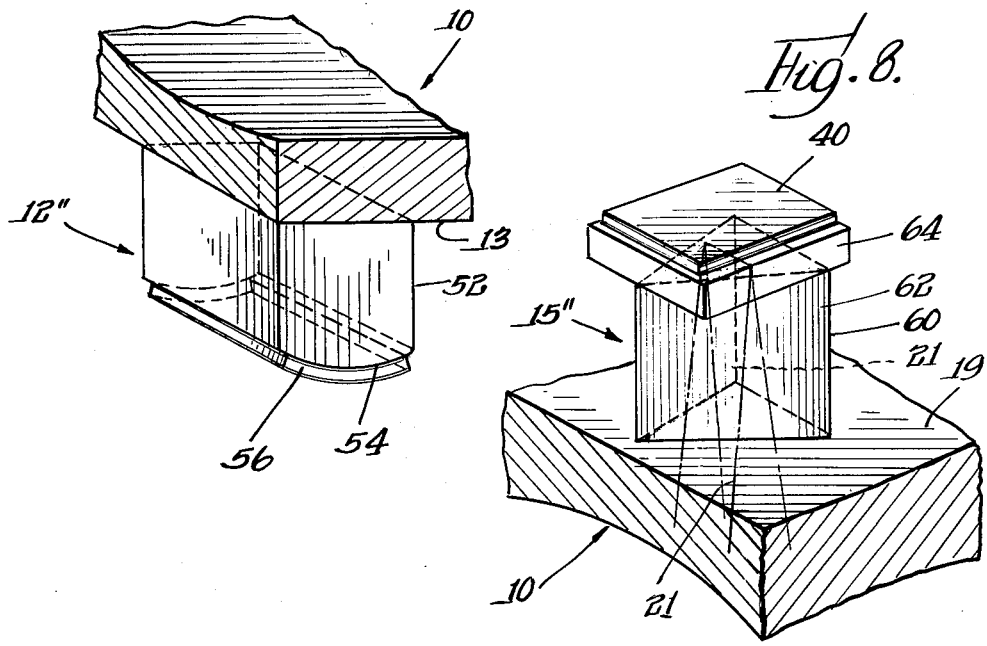
Fig. 7.
Fig. 8.
INVENTOR.
Heinz H. Kallmann
BY Wallenstein,
Spangenberg & Hattis
Attys.

United States Patent Office 3,230,766
Patented Jan. 25, 1966

3,230,766
ULTRASONIC FLOWMETER
Heinz E. Kallmann, New York, N.Y., assignor to Gulton Industries, Inc., Metuchen, N.J., a corporation of New Jersey
Filed Nov. 1, 1962, Ser. No. 234,777
7 Claims. (Cl. 73—194)

This invention relates to ultrasonic flowmeters of the beam deflection type.

In recent years a new form of flowmeter has been developed operating on the deflection of a steep sided, ultrasonic beam generated by a transmitting transducer mounted on one side of a pipe or conduit carrying the fluid to be measured. The beam is directed across the pipe axis and the flow of fluid deflects the beam in a direction transverse to the beam axis. The amplitude of the ultrasonic beam varies across its section in the direction of fluid flow; and the degree of beam deflection, which is a measure of the rate of flow of the fluid, is determined by the amplitude of the signal produced in one or more stationary receiving transducers which each intercept the ultrasonic beam. Normally, the degree of deflection achieved under even large flow rates is a small fraction of an inch. The receiving transducers are preferably mounted on the side of the pipe opposite to that on which the transmitting transducer is mounted. The accuracy of the ultrasonic flowmeter just described depends, among other factors, on the smoothness and repeatability of the shape of the transmitted ultrasonic beam.

It is an object of the present invention to provide an ultrasonic flowmeter of the beam deflection type wherein the accuracy of the flowmeter is to a substantial extent independent of the smoothness and repeatability of the ultrasonic beam.

It is another object of the present invention to provide an ultrasonic flowmeter as just described wherein the accuracy of the apparatus is to a great extent independent of the intensity of the transmitted ultrasonic beam of the signal absorption characteristics of the fluid being measured.

In accordance with one aspect of the present invention, the relatively steep sided transversely directed ultrasonic beam generated by the transmitting transducer is focused into a line on one or more receiving transducers so that each of these intercepts a portion of the beam. In such case, the beam impinges upon discretely different portions of the receiving transducers over the range of flow rates to be measured despite the small degree of deflection of the beam over this range of flow rates. This is in contrast to the beam deflection flowmeters heretofore developed where the beam is of much greater cross section than the receiving transducers. Where two receiving transducers are utilized, the transducers are spaced transversely of the direction of fluid flow and the ultrasonic beam is focused in a line long enough to cover both transducers. Measurement of the small deflection of the ultrasonic beam by the change in the rate of fluid flow is accomplished by interposing a beam-strength varying element in front of the receiving transducers in the path of the ultrasonic beam which element varies the strength of the ultrasonic beam striking the receiving transducers in accordance with the degree of deflection of the beam.

The beam-strength varying element is preferably a support member for one of the receiving transducers which member is mounted on the pipe or conduit carrying the fluid to be measured. In one form, the support member is made of two dissimilar materials, one being a low-attenuation material and the other being a high-attenuation material. By tapering the thickness of the attenuation material in the direction of fluid flow through the conduit, the path length of the transmitted beam through the high attenuation material varies with the deflection of the ultrasonic beam.

The support member can also take the form of a wedge made entirely of a low-attenuation material, the sides of the wedge-shaped member tapering in the direction of fluid flow. The transverse dimension of the transmitted ultrasonic beam reaching the wedge-shaped support member is greater than the widest section of the member which is to intercept the beam. In such case, the portion of the beam which is intercepted by the inner face of the wedge-shaped support member varies with the deflection of the beam in the direction of fluid flow. That portion of the beam which is located beyond the tapered sides of the wedge-shaped support member will merely be reflected at the surface of the pipe and thus will not reach the receiving transducer mounted on the outer face of the support member. It is thus apparent that the proportion of the transmitted beam reaching the receiving transducer on the support member will vary with the varying position of the beam.

The strength of the signal generated by the latter receiving transducer will vary not only with the longitudinal position of the beam but also with the intensity of the ultrasonic beam as it leaves the transmitting transducer and also with the varying sound absorption characteristics of the liquid through which the beam passes. These variations occur independently of the flow rate of the fluid and will cause errors in the flowmeter measurement where the measurement is determined solely by the signal produced in one receiving transducer. These errors can be eliminated by the use of the aforesaid second receiving transducer which may be supported on a member which either has no beam strength varying properties or produces a variation in the strength of the beam reaching the second receiving transducer which is opposite to that produced by the support member carrying the first receiving transducer to provide a push-pull effect. The variations in beam strength reaching the receiving transducers caused by variations in the amplitude of the transmitted beam or the attenuation characteristic of the fluid involved are cancelled out by providing an indication of the ratio of the signals received by the two receiving transducers.

Other objects, advantages and features of the invention will become apparent upon making reference to the specification to follow, the claims and the drawings wherein:

FIG. 1 is a view of a pipe section modified in accordance with the present invention;

FIG. 2 is an enlarged sectional view of the transmitting transducer assembly forming part of FIG. 1;

FIG. 3 is an enlarged sectional view of one of the receiving transducer assemblies of FIG. 1;

FIG. 4 is a perspective view of the transmitting transducer assembly;

FIG. 5 is a perspective view of the receiving transducer assemblies;

FIG. 6 is a block diagram of the entire flowmeter system of the invention;

FIG. 7 is a perspective view of a transmitting transducer assembly which may be employed in place of the transmitting transducer assembly of FIGS. 1–6; and FIG. 8 is a view similar to that of FIG. 2 showing an alternative embodiment of one of the receiving transducer assemblies which may be used in conjunction with the flowmeter of the invention.

Refer now to FIGS. 1 through 6 which illustrate a flowmeter exemplary of the invention applied to a circular pipe or conduit 10 in which the fluid to be measured flows.

A transmitting transducer assembly 12 is mounted in any suitable way, such as by an adhesive, on a flattened surface 13 of the pipe 10. A pair of transversely or circumferentially spaced receiver transducer assemblies 15 and 15' are mounted on a flattened surface 19 preferably on the opposite side of the pipe 10 from the transmitter transducer assembly 12. In a manner to be described, the transmitter transducer assembly 12 directs a focused beam 21 through the walls of the conduit and into the body of flowing fluid in the pipe 10. The focused beam then passes through the walls of the pipe on the opposite side thereof and impinges upon the receiver transducer assemblies 15 and 15'. The beam's longitudinal position in the pipe 10 depends upon the direction and the velocity of flow of fluid therein. In FIG. 1, 21 represents the position of the beam when the fluid is stationary and the 21' represents an exaggerated displacement of the beam under a fluid flow condition. (The actual maximum degree of deflection of the beam for most applications is usually a small fraction of an inch.)

As shown in FIGS. 1 and 5, the beam is a focused beam which, at the point it strikes the outer side of the receiver transducer assemblies 15 and 15', is focused into a line whose width is exceedingly small in the direction of fluid flow (i.e. longitudinally) so that the beam will strike distinctly different portions of the outer side of the assembly for various flow rates to be measured over the range of rates to be measured, despite the small maximum longitudinal deflection of the beam over this range of flow rates. At least one of the receiver transducer assemblies 15 is designed so that the signal produced therein varies in amplitude with the longitudinal deflection of the beam 21 to provide an indication of flow rate. Various ways in which this result is accomplished will be discussed in detail later on in the specification.

As shown in FIGS. 1, 2 and 4, the transmitting transducer assembly 12 includes a stem or support member 22 which is preferably made of a low-attenuation material (such as metal). The support member 22 has an outer flat face 24 upon which an ultrasonic transmitting transducer 26 is mounted. The transmitting transducer 26 may be a piezoelectric ceramic material, such as barium titanate or lead titanate-zironate. The transmitting transducer 26 is provided with a pair of conductive electrodes 26a and 26b on opposite sides thereof across which an ultrasonic frequency generator 27 (FIG. 6) is connected by conductors 31' to vibrate the transducer in the direction of the electrodes, which is transverse to the axis of the pipe 10. The resulting vibrations are transmitted towards the inner end of the support member 22 which has a cylindrically convex surface 28 having its cylindrical axis transverse to the direction of flow and which is complementary in shape to and fits into the cylindrically concave outer side 29 of a lense 31. The lense 31 has a flat inner face 32 cemented or otherwise bonded to the flattened surface 13 of the pipe 10. The lense 31 is made of a low-attenuation material having a higher sound velocity than the material out of which the pipe 10 and the support member 22 are made so that the wave front of the vibrations will converge toward the receiving transducer assemblies to form the aforesaid focused beam. The transverse dimension of the transmitting transducer 26 and its support member 22 and lense 31 is sufficient that the beam 21 will be intercepted by both receiving transducer assemblies 15 and 15'.

As illustrated, the receiving transducer assembly 15 includes a rectangular composite support member or stem 30 which is substantially narrower in a transverse direction than the support member 22 of the transmitting transducer assembly. The support member 30 has an inner section 30a made of a low-attenuation material having a flat inner face 33 parallel to the pipe axis and which is adhesively or otherwise bonded to the flattened portion 19 of the pipe 10, and an inclined outer face 34 which tapers the same longitudinally, in the direction of flow, as shown in FIG. 3. The support member has an outer section 30b made of a high-attenuation material, such as an epoxy resin material which acts as a sound absorbent material. The outer section 30b of the support member has an inclined inner face 36 which is bonded to and is complementary in shape to the inclined outer face 34 of the inner support section 30a. The outer face 38 of the outer section 30b extends parallel to the axis of the pipe 10.

From the above description of the composite support member 30, it is apparent that, as the ultrasonic beam 21 is deflected, to the left as shown in FIG. 3, the beam will traverse a longer path length through the high-attenuation material of the outer support member section 30b, resulting in a progressively lesser intensity of vibration reaching the outer face 38 of the support member 30.

A thin receiving transducer 40 covers substantially the entire outer face 38 of the support member 30. The receiving transducer 40 may be a piezoelectric material similar to the material of which the transmitting transducer 26 is made. The receiving transducer 40 has outer electrodes 40a and 40b across which a voltage is generated by the vibrations impinging upon the transducer. Conductors 41 extend from the electrodes 40a and 40b to a receiver channel generally indicated by reference numeral 36 in FIG. 6. As previously indicated, the strength of these vibrations depends upon the degree and direction of deflection of the transmitted beam 21. The focal line of the focused beam 21 is near the plane of the receiving transducer 40, as illustrated in FIG. 1.

The other illustrated receiving transducer assembly 15' is identical in size and construction to the receiving transducer assembly 15 except for its support member 30', and the parts of the assembly 15' have been numbered like the corresponding parts of the assembly 15 except that a prime (') is added to each reference number. The support member 30' is of the same size as the support member 30, but has a different vibration transmitting characteristic. For example, the support member 30' may be made of a low-attenuation material throughout where its sole function is to establish a reference signal whose amplitude varies with the amplitude of the transmitted beam which reaches the inner end of the receiving transducer assembly due to variations in the output of the ultrasonic frequency generator 27 or the vibration absorption characteristics of the fluid in the pipe 10. Then, as above indicated, by measuring only the ratio of the outputs of the two receiver transducer assemblies 15 and 15', the effects of the latter amplitude variations will be cancelled out.

As illustrated, however, the support member 30' is a composite support member like the support member 30 except that the direction of the taper of the two sections 30a' and 30b' thereof is reversed to that of the sections 30a and 30b of the support member 30, so that the voltage generated by the receiving transducers 40–40' thereof will vary in the opposite direction to the output of the receiving transducer 40 for a given deflection of the beam. This produces what is referred to as a push-pull effect. The cancellation of the effects of the variations in intensity of the ultrasonic beam transmitted through the pipe will still take place.

The outer electrodes of the receiving transducer 40' are connected to a receiver channel 36'. The receiver channels 36 and 36' may take a variety of forms. As illustrated, each channel includes an RF amplifier section 41 or 41' followed by a series of stages 43–45 or 43'–45' whose outputs are interconnected in a manner to provide a measurement of the ratio of the outputs of the receiver transducer assemblies 15 and 15', observed on a suitable meter or indicator 47. The taper of the sections 30b and 30b' of the support members 30 and 30' may be linear. As illustrated in FIG. 6, suitable logarithmic circuits 45 and 45' each produces an output proportional to the logarithm of the signal amplitude. The outputs of the circuits 45 and 45' are differentially connected to the meter 47 to produce a measurement of the difference of the logarithmic outputs, which gives a linear measurement of the beam deflection.

Various modifications may be made of the forms of the invention shown in FIGS. 1 through 6 without deviating from the broader aspects of the invention. For example, various variations in the design of the transmitting and receiving transducer assemblies may be made without departing from the broader aspects of the present invention. Thus, referring now to FIG. 7 which illustrates a modified transmitting transducer assembly 12" for focusing the transmitted beam 21, this transmitting transducer assembly there shown includes a metal support member 52 having a cylindrically convex outer face 54 forming a curved transmitting transducer 56. The support member 52 is preferably made of metal and, due to the curvature of the transmitting transducer 56, provides a cylindrically focused beam without the use of two metals with differing sound velocities as in the case of the transmitting transducer assembly 12 of FIG. 1.

Refer now to FIG. 8 which shows a receiving transducer assembly 15" which can be substituted for receiving transducer assembly 15 and/or 15'. In this form of the invention, instead of obtaining a variation in the strength of the vibrations reaching the receiving transducer 40 by varying the intensity of the ultrasonic beam 21 through a high-attenuation material, a similar result is achieved by varying the beam intercepting width of a wedge-shaped support member 60 carrying the receiving transducer 40 as the beam is deflected. The support member 60 has tapered sides 62 which converge longitudinally of the pipe axis. The width of the beam 21 is at least as wide as the widest portion of the support member 60 to be struck by the beam and is much wider than this in the case where two receiving transducer assemblies are utilized so that the beam covers both receiving transducer assemblies. In FIG. 8, the receiving transducer 40 is shown as a flat rectangular ceramic body adhesively or otherwise bonded to a rectangular block 64 made of a low-attenuation material, such as metal. The block 64 in turn is bonded to the upper triangular face of the wedge-shaped support member 60. It is apparent that the support member 60 will intercept a varying width of the beam 21 measured transversely of the pipe axis as the beam is displaced longitudinally by the flow of fluid in the pipe. As the support member 60 intercepts different proportions of the beam width, it will accordingly transmit vibrations of similarly varying amplitude to the receiving transducer 40.

It is apparent that the accuracy of the flowmeter of the present invention is not limited to any significant degree by the smoothness and repeatability of the shape of the transmitted beam as in the case of beam deflection flowmeters heretofore developed.

What I claim as new and desire to protect by Letters Patent of the United States is:

1. A flowmeter for measuring the rate of fluid flow in a conduit, the flowmeter comprising: a transmitting transducer mounted on a side of said conduit for directing a convergently focused ultrasonic beam across the fluid flowing in said conduit, at least one receiving transducer mounted on a side of the conduit to receive the transmitted beam traversing the fluid flowing in the conduit, only a relatively small portion of the receiving transducer measured parallel to the direction of fluid flow intercepting the focused beam, wherein distinctly different portions of the transducer are struck by the beam as the beam is deflected to different degrees by the varying rates of flow of the fluid, beam strength varying means interposed between the oncoming beam and the receiving transducer means for varying the strength of the beam impinging on the receiving transducer with the degree of deflection of the beam in the direction of fluid flow, and means responsive to the varying output of said receiving transducer for indicating the degree of beam deflection and hence the rate of fluid flow.

2. A flowmeter for measuring the rate of fluid flow in a conduit, the flowmeter comprising: a transmitting transducer mounted on a side of said conduit for directing a convergently focused ultrasonic beam across the fluid flowing in said conduit, at least one receiving transducer mounted on a side of the conduit to receive the transmitted beam traversing the fluid flowing in the conduit only a relatively small portion of the receiving transducer measured parallel to the direction of fluid flow intercepting the focused beam, wherein distinctly different portions of the transducer are struck by the beam as the beam is deflected to different degrees by the varying rates of flow of the fluid, beam strength varying means interposed between the oncoming beam and the receiving transducer for varying the strength of the beam impinging on the receiving transducer with the degree of deflection of the beam in the direction of fluid flow, said beam strength varying means comprising a support member on the outside of which said receiving transducer is mounted, said support member having a progressively varying vibration absorption characteristic longitudinally of the conduit, and means responsive to the varying output of said receiving transducer for indicating the degree of beam deflection and hence the rate of fluid flow.

3. A flowmeter as described in claim 2 wherein said support member is formed partly of a relatively low attenuation material and partly of a relatively high attenuation material and wherein the path length of the vibrations passing respectively through the dissimilar materials progressively increases for one of the materials as it progressively decreases for the other material as the beam is deflected by the fluid flow.

4. A flowmeter for measuring the rate of fluid flow in a conduit, the flowmeter comprising: a transmitting transducer mounted on a side of said conduit for directing a convergently focused ultrasonic beam across the fluid flowing in said conduit, at least one receiving transducer mounted on a side of the conduit to receive the transmitted beam traversing the fluid flowing in the conduit only a relatively small portion of the receiving transducer measured parallel to the direction of fluid flow intercepting the focused beam, wherein distinctly different portions of the transducer are struck by the beam as the beam is deflected to different degrees by the varying rates of flow of the fluid, beam strength varying means interposed between the oncoming beam and the receiving transducer for varying the strength of the beam impinging on the receiving transducer with the degree of deflection of the beam in the direction of fluid flow, said beam strength varying means comprising a support member on the outside of which said receiving transducer is mounted, said support member having a vibration transmitting characteristic which progressively varies in the direction of fluid flow, wherein the strength of the beam reaching the receiving transducer varies with the beam deflection and hence with the fluid flow rate, and means responsive to the varying output of said receiving transducer for indicating the degree of beam deflection and hence the rate of fluid flow.

5. A flowmeter for measuring the rate of fluid flow in a conduit, the flowmeter comprising: a pair of receiving transducers spaced transversely of the direction of fluid flow on one side of the conduit, a transmitting transducer carried on the other side of the conduit for transmitting a focused ultrasonic beam through the conduit walls and the fluid flowing therein which beam has a sufficient width transversely of the conduit to impinge upon both receiving transducers, the focused beam at the receiving transducers intercepting only a relatively small longitudinal portion of the receiving transducers measured parallel to the direction of fluid flow, wherein different discrete portions of the transducers are struck by the beam as the beam is deflected to different degrees by the varying rates of flow of the fluid, beam strength varying means placed in the path of the portion of the oncoming beam directed at one of said receiving transducers for varying the strength of the ultrasonic beam impinging thereon in accordance with the longitudinal deflection of the beam to vary the signal produced by said one receiving transducer in accordance with the rate of fluid flow, the strength of the ultrasonic beam impinging on the other receiving transducer being substantially unaffected by the deflection of the focused beam, and measuring means responsive to the difference in the signal amplitudes produced by said receiving transducers for indicating the extent of the deflection of the ultrasonic beam and hence the rate of flow of the fluid in the conduit.

6. A flowmeter for measuring the rate of fluid flow in a conduit, the flowmeter comprising: a pair of receiving transducer spaced transversely of the direction of fluid flow on one side of the conduit, a transmitting transducer carried on the other side of the conduit for transmitting a focused ultrasonic beam through the conduit walls and the fluid flowing therein which beam has a sufficient width transversely of the conduit to impinge upon both receiving transducers, the focused beam at the receiving transducers intercepting only a relatively small longitudinal portion of the receiving transducers measured parallel to the direction of fluid flow, wherein different discrete portions of the transducers are struck by the beam as the beam is deflected to different degrees by the varying rates of flow of the fluid, beam strength varying means placed in the path of the portion of the oncoming beam directed at one of said receiving transducers for varying the strength of the ultrasonic beam impinging thereon in accordance with the longitudinal deflection of the beam to vary the signal produced by said one receiving transducer in accordance with the rate of fluid flow, the strength of the ultrasonic beam impinging on the other receiving transducer varying in the opposite direction with the degree of beam deflection to that of the beam striking said one receiving transducer, and measuring means responsive to the difference in the signal amplitudes produced by said receiving transducers for indicating the extent of the deflection of the ultrasonic beam and hence the rate of flow of the fluid in the conduit.

7. A flowmeter for measuring the rate of fluid flow in a conduit, the flowmeter comprising: a pair of receiving transducers spaced transversely of the direction of fluid flow on one side of the conduit, a transmitting transducer carried on the other side of the conduit for transmitting a focused ultrasonic beam through the conduit walls and the fluid flowing therein which beam has a sufficient width transversely of the conduit to impinge upon both receiving transducers, the focused beam at the receiving transducers intercepting only a relatively small longitudinal portion of the receiving transducers measured parallel to the direction of fluid flow, wherein different discrete portions of the transducers are struck by the beam as the beam is deflected to different degrees by the varying rates of flow of the fluid, beam strength varying means placed in the path of the oncoming beam directed at one of said receiving transducers for varying the strength of the ultrasonic beam impinging thereon in accordance with the longitudinal deflection of the beam to vary the signal produced by said one receiving transducer in accordance with the rate of fluid flow, separate receiving and amplifying channels associated with said receiving transducers, each of said amplifying channels including means for providing an output which is a function of the logarithm of the input thereto, and means for subtracting the logarithmic outputs of said last mentioned means to provide a linear measurement of the deflection of the beam in the conduit.

References Cited by the Examiner
UNITED STATES PATENTS
2,874,568   2/1959   Petermann _____ 73—194

RICHARD C. QUEISSER, *Primary Examiner.*